United States Patent
Brown et al.

(10) Patent No.: US 10,133,341 B2
(45) Date of Patent: Nov. 20, 2018

(54) DELEGATING COMPONENT POWER CONTROL

(71) Applicant: ARM Limited, Cambridge (GB)

(72) Inventors: Dominic William Brown, Ely (GB); Ashley John Crawford, Ashdon (GB); Christopher Vincent Severino, Haverhill (GB); Tessil Thomas, Cambridge (GB)

(73) Assignee: Arm Limited, Cambridge (GB)

( * ) Notice: Subject to any disclaimer, the term of this patent is extended or adjusted under 35 U.S.C. 154(b) by 130 days.

(21) Appl. No.: 15/173,939

(22) Filed: Jun. 6, 2016

(65) Prior Publication Data

US 2017/0351319 A1    Dec. 7, 2017

(51) Int. Cl.
*G06F 1/32*  (2006.01)
*G06F 13/24* (2006.01)

(52) U.S. Cl.
CPC .......... *G06F 1/3287* (2013.01); *G06F 1/3206* (2013.01); *G06F 13/24* (2013.01); *Y02D 10/172* (2018.01)

(58) Field of Classification Search
None
See application file for complete search history.

(56) References Cited

U.S. PATENT DOCUMENTS

| | | | | |
|---|---|---|---|---|
| 7,051,306 B2* | 5/2006 | Hoberman | ........... | G06F 1/3203 716/127 |
| 7,523,331 B2* | 4/2009 | Van Der Heijden | ........... | G06F 1/3225 713/300 |
| 8,010,822 B2* | 8/2011 | Marshall | ........... | G06F 1/3203 713/323 |
| 8,234,430 B2* | 7/2012 | Zipperer | ........... | G06F 9/4812 710/260 |
| 8,271,812 B2* | 9/2012 | de Cesare | ........... | G06F 1/3203 345/211 |
| 8,458,499 B2* | 6/2013 | Brey | ........... | G06F 1/3203 713/320 |
| 8,601,288 B2* | 12/2013 | Brinks | ........... | G06F 1/26 365/202 |

(Continued)

OTHER PUBLICATIONS

'An Analysis of Efficient Multi-Core Global Power Management Policies: Maximizing Performance for a Given Power Budget' by Canturk Isci et al., copyright 2006, IEEE.*

(Continued)

*Primary Examiner* — Steven Snyder
(74) *Attorney, Agent, or Firm* — Leveque IP Law, P.C.

(57) ABSTRACT

An apparatus and a corresponding method of operating the apparatus are disclosed. A component of the apparatus is capable of operating in one of at least two power modes and component power control circuitry which is communicatively coupled to the component causes the component to operate in a selected power mode of those power modes. A system power controller controls operation of the component power control circuitry by setting a power mode lock condition therein. When the power mode lock condition is met the component power control circuitry cannot change the selected power mode of the component. Power control over the component is thus partially delegated from the system power controller to the component power control circuitry.

12 Claims, 5 Drawing Sheets

(56) References Cited

U.S. PATENT DOCUMENTS

| | | | | |
|---|---|---|---|---|
| 8,775,839 B2* | 7/2014 | Cousson | G06F 1/3203 | 713/322 |
| 9,304,573 B2* | 4/2016 | Lee | G06F 1/3296 | |
| 9,310,867 B2* | 4/2016 | Brinks | G06F 1/26 | |
| 9,606,605 B2* | 3/2017 | Mylius | G06F 1/3209 | |
| 9,703,354 B2* | 7/2017 | Lee | G06F 1/3296 | |
| 9,733,689 B2* | 8/2017 | Muralidhar | G06F 1/3203 | |
| 9,817,469 B2* | 11/2017 | Lee | G06F 1/3296 | |
| 2005/0125703 A1* | 6/2005 | Lefurgy | G06F 1/3203 | 713/320 |
| 2008/0040786 A1* | 2/2008 | Chang | G06F 1/3287 | 726/10 |
| 2009/0049220 A1* | 2/2009 | Conti | G06F 13/24 | 710/267 |
| 2009/0157936 A1* | 6/2009 | Goss | G06F 1/3203 | 710/264 |
| 2009/0204831 A1* | 8/2009 | Cousson | G06F 1/3203 | 713/322 |
| 2010/0191979 A1* | 7/2010 | Zipperer | G06F 9/4812 | 713/189 |
| 2011/0093724 A1* | 4/2011 | Park | G06F 1/3203 | 713/300 |
| 2011/0213950 A1* | 9/2011 | Mathieson | G06F 1/206 | 712/30 |
| 2012/0054511 A1* | 3/2012 | Brinks | G06F 1/26 | 713/310 |
| 2012/0192002 A1* | 7/2012 | Kojo | G06F 1/3203 | 713/324 |
| 2013/0283026 A1* | 10/2013 | Wells | G06F 1/26 | 713/1 |
| 2013/0311796 A1* | 11/2013 | Brinks | G06F 1/26 | 713/300 |
| 2014/0380071 A1* | 12/2014 | Lee | G06F 1/3296 | 713/321 |
| 2016/0041608 A1* | 2/2016 | Lee | G06F 9/5094 | 713/320 |
| 2016/0282919 A1* | 9/2016 | Wells | G06F 1/26 | |
| 2016/0378160 A1* | 12/2016 | Muralidhar | G06F 1/3203 | 713/323 |

OTHER PUBLICATIONS

'3. Semaphores and Locks', Chapter 3 Lecture Notes from George Mason University, R Carver, archived on Apr. 18, 2016.*

* cited by examiner

DELEGATING COMPONENT POWER CONTROL

TECHNICAL FIELD

The present disclosure relates to a data processing apparatus. More particularly, it relates to delegating power control of a component of the data processing apparatus.

BACKGROUND

In a data processing apparatus, such as a system-on-chip, there may be components which are not required to be permanently powered and therefore it may be desired to switch these components off when they are not being used in order to reduce power consumption.

SUMMARY

At least one example described herein provides an apparatus for processing data comprising: a component capable of operating in at least two power modes; component power control circuitry communicatively coupled to the component to cause the component to operate in a selected power mode of the at least two power modes; and a system power controller comprising instruction execution circuitry to execute a set of instructions to control operation of the component power control circuitry by setting a power mode lock condition in the component power control circuitry, wherein when the power mode lock condition is met the component power control circuitry cannot change the selected power mode of the component.

At least one example described herein provides a method of operating an apparatus for processing data comprising: signalling to a component of the apparatus from component power control circuitry of the apparatus to cause the component to operate in a selected power mode of at least two power modes; operating the component of the apparatus in the selected power mode; executing a set of instructions in a system power controller to control operation of the component power control circuitry by setting a power mode lock condition in the component power control circuitry; and when the power mode lock condition is met, preventing the component power control circuitry from changing the selected power mode of the component.

At least one example described herein provides an apparatus for processing data comprising: means for signalling to a component of the apparatus from component power control circuitry of the apparatus to cause the component to operate in a selected power mode of at least two power modes; means for operating the component of the apparatus in the selected power mode; means for executing a set of instructions in a system power controller to control operation of the component power control circuitry by setting a power mode lock condition in the component power control circuitry; and means preventing the component power control circuitry from changing the selected power mode of the component when the power mode lock condition is met.

BRIEF DESCRIPTION OF THE DRAWINGS

The present techniques will be described further, by way of example only, with reference to embodiments thereof as illustrated in the accompanying drawings, in which.

DESCRIPTION OF EXAMPLE EMBODIMENTS

Figure 1:
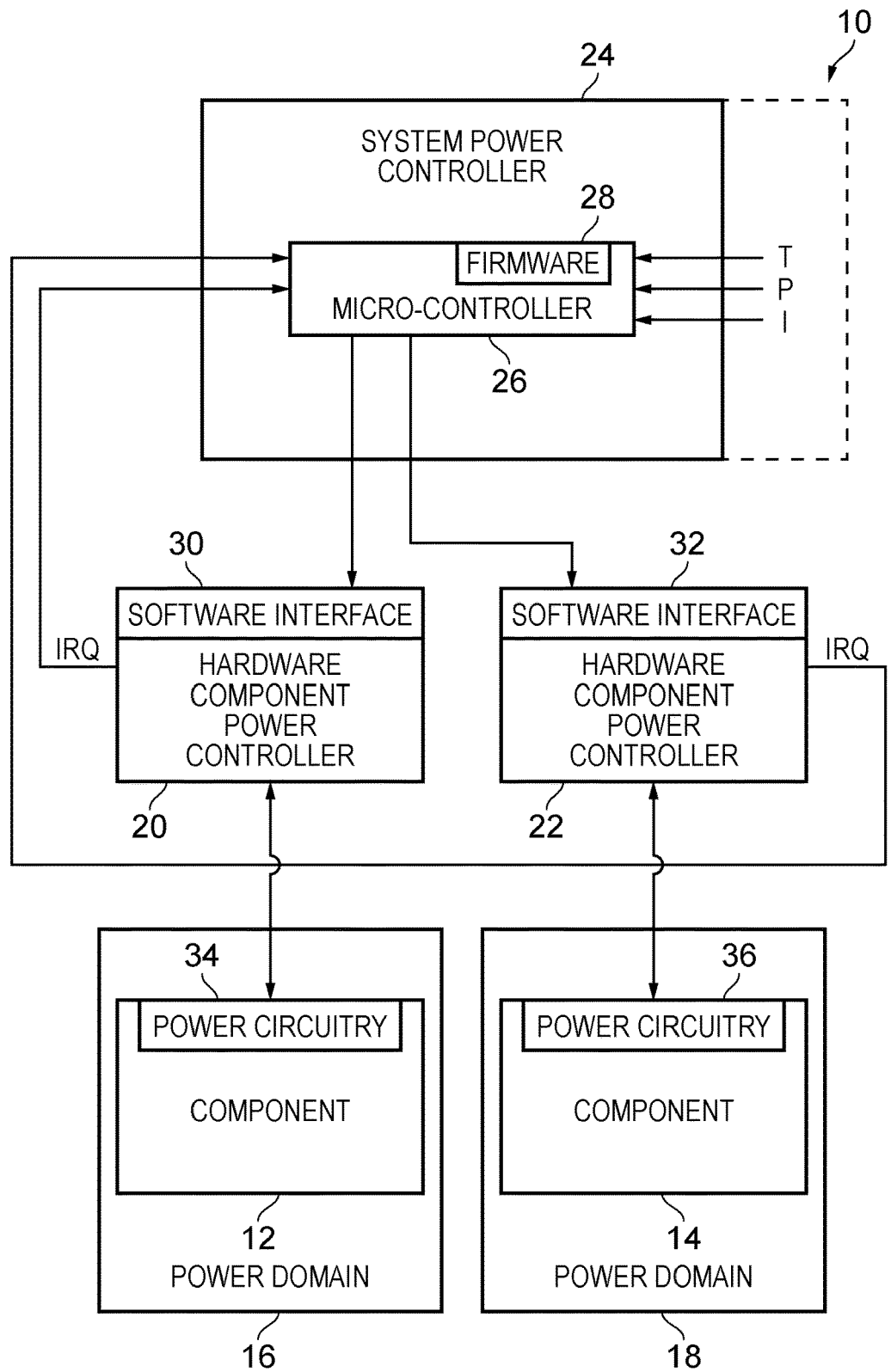
FIG. 1 schematically illustrates an apparatus in one embodiment in which two components of the apparatus each have an associated hardware component power controller.

In some example embodiments there is an apparatus for processing data comprising: a component capable of operating in at least two power modes; component power control circuitry communicatively coupled to the component to cause the component to operate in a selected power mode of the at least two power modes; and a system power controller comprising instruction execution circuitry to execute a set of instructions to control operation of the component power control circuitry by setting a power mode lock condition in the component power control circuitry, wherein when the power mode lock condition is met the component power control circuitry cannot change the selected power mode of the component.

A system power controller for the apparatus which executes instructions, for example taking the form of a power control microcontroller running firmware, has flexibility in its configurability by contrast with a hardware state machine which would be specific to the apparatus (e.g. a system-on-chip) and would therefore be costly to verify. However, the present techniques recognise that if the system power controller were to interact directly with the components to be switched between power modes, then, if those components were to make a high-frequency of power mode transition requests due to their varying workloads, managing the power modes of the components could be a significant workload for the system power controller. This could lead to other tasks being delayed or the processing power of the system power controller needing to be large (and therefore consuming more power itself and/or occupying a greater area). To address this the present techniques provide component power control circuitry, to which some of the control of the power mode selection of the component is delegated, thus reducing the processing burden on the system power controller. However, the present techniques further recognise that fully delegating all power mode control for the component to its associated component power control circuitry would not allow the system power controller to manage the system-level power characteristics of the apparatus. To address this, the system power controller sets (defines) a power mode lock condition in the component power control circuitry which, once met, has the result that the component power control circuitry cannot change the power mode of the component. Depending on the particular definition of the power mode lock condition this then means that the system power controller can allow the component to have some movement between its power modes under the control of the component power control circuitry, but once the power mode lock condition is met, the power mode of the component will not change until the system power controller intervenes to allow this happen. The system power controller therefore retains a level of control over the power mode switching of the component, this in particular allowing it to maintain a system-wide control of the power characteristics of the apparatus.

The power mode lock condition may be defined in a variety of ways in dependence on the particular system requirements, but in some embodiments when the power mode lock condition is met the component power control circuitry cannot raise the selected power mode of the component from a first power mode of the at least two power modes to a second power mode of the at least two power modes, wherein a power consumption of the second power mode is greater than a power consumption of the first power mode. Accordingly, this definition of the power mode lock condition means that once the component power control circuitry has switched the component into the first (lower) power mode, it cannot cause the component to switch into the second (higher) power mode autonomously. For example, where the component only has two power modes, on and off, this means that the component power control circuitry can cause the component to switch off, but it cannot cause the component to switch on again without the assistance of the system power controller. In another example, where the component has three power modes, on, retention, and off, the power mode lock condition may be defined such that the component power control circuitry can freely switch the component between its on power mode and its retention power mode, and into its off power mode, but once it has been switched into its off power mode, the component cannot be switched on again by the component power control circuitry until the system power controller intervenes to allow this happen. This means that the additional power consumption in turning on the component again remains under the control of the system power controller and therefore enables the system power controller to have an improved system-wide management of the power characteristics of the apparatus.

In some embodiments the power mode lock condition defines a minimum power mode of the component and when the component power control circuitry causes the component to enter the minimum power mode the power mode setting circuitry of the component power control circuitry becomes locked, and the component power control circuitry cannot change the selected power mode of the component until the system power controller unlocks the component power control circuitry. Accordingly, the component power control circuitry can thus freely switch the component between power modes that are above the minimum power mode, but once it has been switched into its minimum power mode, the component cannot be switched on again by the component power control circuitry until the system power controller intervenes to allow this happen. This means that the component remains in the minimum power mode until the system power controller allows it to (at least partially) power on again and therefore give the system power controller further control over the system-wide management of the power characteristics of the apparatus.

In some embodiments the component is capable of requesting a specified power mode above the minimum power mode set by the system power controller. Although the component may in principle request any of its power modes to be implemented by the component power control circuitry, the component can thus limit itself to selection of (requests for) those power modes which are above the minimum power mode and therefore will not result in the component power control circuitry becoming locked.

The system power controller may take a variety of criteria into account when determining whether and when to release the power mode lock condition, but in some embodiments the system power controller comprises system monitoring circuitry to monitor at least one system parameter from the group comprising: a total power consumption of the apparatus; a temperature of the apparatus; and a rate-of-current-change in the apparatus, and, when the power mode condition is met, the system power controller releases the power mode lock condition in dependence on the at least one system parameter. The provision of system monitoring circuitry to monitor system parameters such as power consumption, temperature and rate-of-current-change mean that the system power controller can maintain control of these quantities in the apparatus by deciding when to release (reset) the power mode lock condition in dependence thereon. For example, the system power controller can thus prevent the component from switching power modes when it is determined that this would have an adverse effect on at least one of these system parameters or may set switching rules for the component such that a predetermined approach to maintaining at least one of the system parameters within given bounds may be maintained.

The component power control circuitry may be provided in a variety of ways, but in some embodiments the component power control circuitry comprises finite state machine circuitry, wherein a state of the finite state machine circuitry sets the selected power mode of the component and when the power mode lock condition is met the component power control circuitry cannot change the state of the finite state machine circuitry. This provides a reliable hardware-based mechanism for ensuring that the power modes of the component and the transitions between them are well defined and, when the power mode lock condition is met, to prevent a power mode change for the component.

In some embodiments the component power control circuitry comprises at least one register, wherein content of the at least one register defines the power mode lock condition, and the system power controller is capable of changing the content of the at least one register via a software interface between the system power controller and the component power control circuitry. A register-based approach thus provides a flexible manner of defining the power mode lock condition and furthermore provides the system power controller with a flexible mechanism (via the software interface) to define and/or reset (release) the power mode lock condition.

Having delegated the control over the power mode of the component to the component power control circuitry, the component power control circuitry and the component may interact in a variety of ways to set the power mode of the component. In some embodiments the component power control circuitry is responsive to a power mode change request from the component itself to change the selected power mode of the component when the power mode lock condition is not met. Accordingly, the component can therefore request a particular power mode and, as long as the power mode lock condition is not met, the component power control circuitry can then respond by changing the power mode of the component appropriately.

It should be noted that a request for a power mode change for the component need not come from the component itself and in some embodiments the component power control circuitry is responsive to a power mode change request from another component in the apparatus to change the selected power mode of the component when the power mode lock condition is not met. A further component in the apparatus may for example be dependent on operation of the component and therefore may itself request that the power mode of the component is changed. For example, where the component is in its "off" power mode, and the other component requires it to be (at least temporarily) active, the other component can signal this request to the component power control circuitry.

In some embodiments the component power control circuitry comprises interrupt generation circuitry to issue an interrupt to the system power controller to signal that the power mode lock condition is met. Thus, when the power mode lock condition it met, preventing the component power control circuitry from changing the selected power mode of the component, this fact can be signalled to the system power controller by means of an interrupt. Hence, the system power controller can be made aware of the fact that the component power controller circuitry now requires the intervention of the system power controller to enable the power mode of the component to be changed. Moreover, until the power mode lock condition is met no information about power mode changes for the component is transmitted to the system power controller, reducing its processing burden.

Such an interrupt mechanism for signalling to the system power controller may also be made use of to notify to the system power controller that the component is requesting a power mode change which will require the system power controller to intervene. For example in some embodiments the interrupt generation circuitry is capable of issuing an interrupt to the system power controller to signal a power mode change request to the system power controller whilst the power mode lock condition is met. In one such example, the component itself may wish to change its power mode, such as when it has previously been locked down in a low power "retention" mode, and generate a wake up request to indicate this request to move to a fully powered "on" mode. Thus, the component power control circuitry may receive such a wake up request from the component and signal this to the system controller by means of an interrupt. The system power controller can then determine whether this power mode change request should be fulfilled and, if appropriate, intervene to allow it.

In some embodiments the apparatus further comprises a further component capable of operating in at least two power modes, wherein the further component is capable of autonomously switching between the at least two power modes independently of the system power controller. Accordingly, in some configurations there may be various components within the system which can each have a different power control relationship with respect to the system power controller. Some components may be capable of autonomous power mode switching, whilst some are at least partially dependent on the system power controller. This may be achieved by means of component power control circuitry associated with each component of the apparatus being so configured (at least temporarily) by the system power controller. For example, in configuring the component power control circuitry instances present in the apparatus, the system power controller may allow the component power circuitry which controls the power modes of a component which consumes relative little power to operate autonomously, whilst maintaining a degree of control over the component power control circuitry associated with more power hungry components. To take just one example, where an apparatus comprises more than one processor core, and those processor cores have a range of power characteristics, a more powerful (and also more power hungry) core may be kept under (at least partial) power control of the system power controller, whilst a less powerful (and less power hungry) core may be allowed to choose its power mode autonomously.

In some embodiments the apparatus comprises a further component comprised within a shared power domain with the component, wherein the further component is capable of operating in the at least two power modes and a domain power mode of the shared power domain defines the selected power mode, wherein the component power control circuitry is communicatively coupled to the shared power domain to cause all components in the shared power domain to operate in the selected power mode of the at least two power modes, and wherein when the power mode lock condition is met the component power control circuitry cannot change the selected power mode of the shared power domain. Thus, the component power control circuitry may control the power for just one component, but may also control the power for more than one component, where the component power control circuitry controls the power mode of a power domain, and more than one component is comprised within that power domain.

In some embodiments there is a method of operating an apparatus for processing data comprising: signalling to a component of the apparatus from component power control circuitry of the apparatus to cause the component to operate in a selected power mode of at least two power modes; operating the component of the apparatus in the selected power mode; executing a set of instructions in a system power controller to control operation of the component power control circuitry by setting a power mode lock condition in the component power control circuitry; and when the power mode lock condition is met, preventing the component power control circuitry from changing the selected power mode of the component.

In some embodiments there is an apparatus for processing data comprising: means for signalling to a component of the apparatus from component power control circuitry of the apparatus to cause the component to operate in a selected power mode of at least two power modes; means for operating the component of the apparatus in the selected power mode; means for executing a set of instructions in a system power controller to control operation of the component power control circuitry by setting a power mode lock condition in the component power control circuitry; and means preventing the component power control circuitry from changing the selected power mode of the component when the power mode lock condition is met.

Some particular embodiments will now be described with reference to the figures. FIG. 1 schematically illustrates an apparatus 10 in one embodiment. Two components 12 and 14 of the apparatus 10 are shown, each residing within its own power domain 16 and 18 respectively. The apparatus 10 further comprises hardware component power controllers 20 and 22, each respectively associated with one of the components 12 and 14, and to which power mode control of the respective component is at least partially delegated by the system power controller 24. The system power controller 24 maintains overall power control of the apparatus and comprises a microcontroller 26, which is programmed to perform the system power control function by means of the firmware 28 which its executes. It will therefore be understood by one of ordinary skill in the art that the microcontroller 26 comprises various processing circuitry (instruction execution circuitry) to enable it to do this, specific illustration of which is dispensed with in FIG. 1 purely for the purposes of visual clarity.

The system power controller 24 is also shown receiving the signals T, P, and I, which represent temperature information, power consumption information and current consumption (for example in the form of a rate of change of current measurement). As will discussed in more detail below, the system power controller 24, or more specifically the microcontroller 26, can then administer the power control of the components 12 and 14 in dependence on the information it receives regarding temperature, power and current. The dashed line in FIG. 1 schematically illustrates the fact that the T, P, I information could come from corresponding measurement circuitry outside the system power controller 24, or such measuring circuitry could also be comprised within the power controller 24 itself. In the above-mentioned example of a rate of change of current measurement, the micro-controller 26 may determine this quantity itself on the basis of instantaneous current measurements. The microcontroller 26 exerts control over the hardware component power controllers 20 and 22 via the software interfaces 30, 32. Each hardware component power controller 20, 22 is able to generate interrupts (IRQ) by means of which it can communicate with the microcontroller 26 in the system power controller 24. Each component 12, 14 comprises power circuitry 34, 36 which operates under the direct control of the corresponding hardware component power controller 20, 22 as will be described in more detail below with reference to the following figures.

Figure 2:
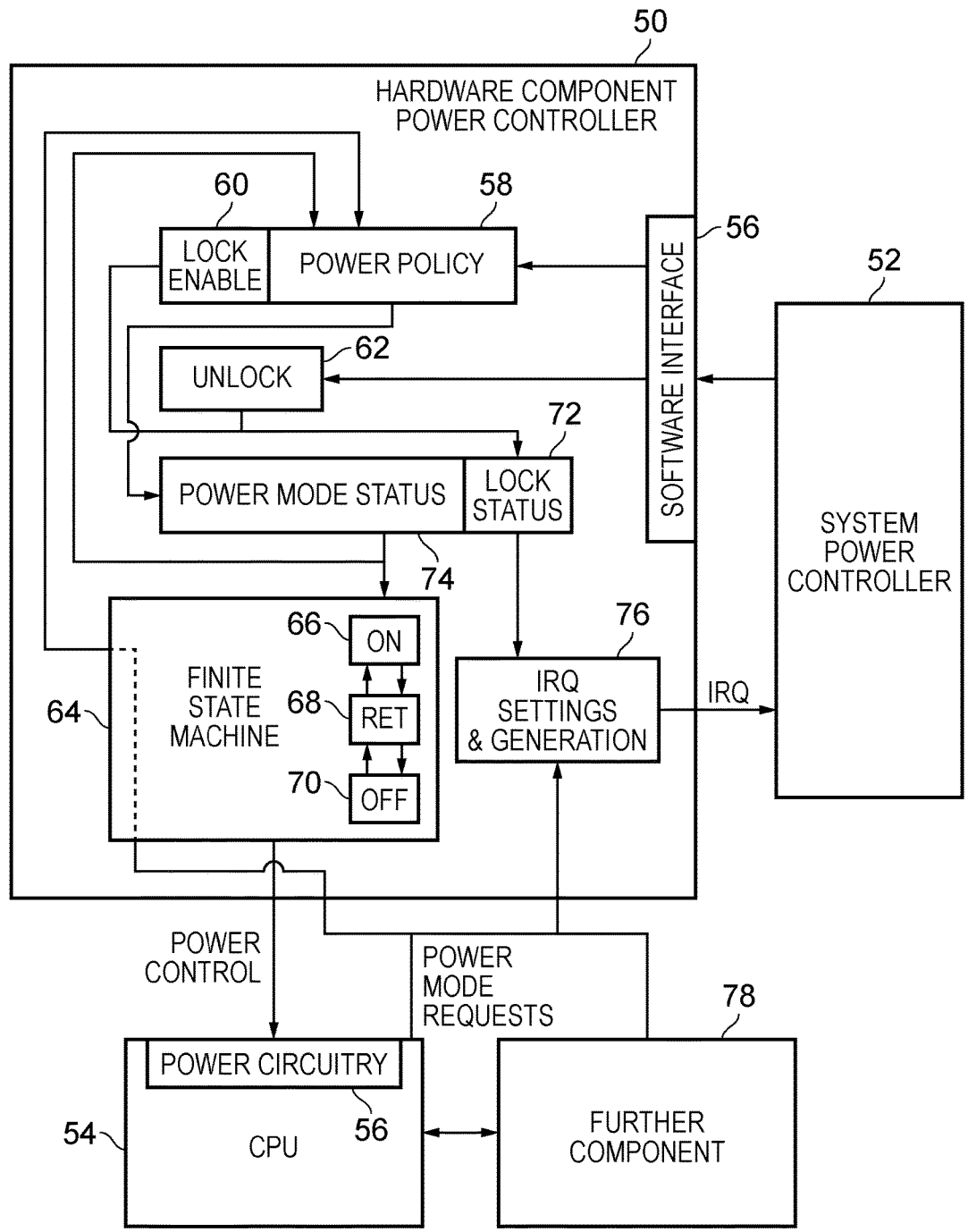
FIG. 2 schematically illustrates in more detail the internal configuration of a hardware component power controller in one embodiment.

FIG. 2 schematically illustrates in more detail some components of a hardware component power controller 50 in one embodiment. As will be understood from the above discussion of FIG. 1, the hardware component power controller 50 is associated with a component of the apparatus in order to control the power mode selection for this component on behalf of the system power controller (52 in this embodiment). Here, the component being power controlled is the CPU 54. The CPU 54 is able to be put into one of three power modes: on, retention, or off. This occurs by means of the power circuitry 56. Control over the power circuitry 56 comes from the hardware component power controller 50, which in turn is controlled by the system power controller 52.

The hardware component power controller 50 comprises a software interface 56 by means of which the system power controller 52 can directly write to the registers 58, 60 and 62. The content of these registers defines the manner in which the power control of the CPU 54 by the hardware power controller 50 is carried out. At initialisation, the system power controller 52, via the software interface 56, defines a power policy 58. This power policy defines the conditions under which the control of the power mode of the CPU 54 by the hardware power controller 50 will become locked. The lock enable value 60 also needs to be set for the power mode locking mechanism to be active and thus for the power mode locking condition to be met as defined by the power policy. In one example in the context of FIG. 2, the system power controller 52 may define the power policy 58 to correspond to being in the minimum power mode, i.e. off 70, of the CPU 54. In other words, if the component (CPU 54) is put into its off power mode then the power mode lock condition is met according to this definition of the power policy, and the power mode locking mechanism is thus triggered. At initialisation the system power controller also sets the lock enable value 60, enabling the power mode locking mechanism.

In this example, the hardware component power controller 50 further comprises a finite state machine 64 which implements the three power modes for the CPU 54, namely on 66, retention 68 and off 70. The circuitry of the finite state machine 64 ensures that the power mode of the CPU 54 can only transition in a well-defined manner between these three states. The power mode implemented by the finite state machine 64 is defined by the content of the power mode status register 74. The content of the power mode status register 74 is compared to the power policy value 58 in order to determine when the power mode lock condition is met. Power mode requests received either from the CPU 54 itself, or from another system component 78 which interacts with the CPU 54, are compared to the power policy (with reference to the current power mode as indicated by the power mode status value 74 if required) to determine if the request can be fulfilled. If the requested power mode change is allowed, and in particular if the lock status 72 is not set, then the change is implemented by changing the value held in the power mode status register 74. In some examples the component may (temporarily) confine itself to power mode change requests which it is known will not trigger the power mode locking. However, when the power mode lock condition is met and when the lock enable value 60 is set, this causes the lock status 72 to be set, locking the power mode changing mechanism. Once the lock status value 72 is set then the power mode status value 74 cannot be changed until the system power controller 52 intervenes, by writing an unlock value to the unlock register 62, which in turn releases the lock status 72.

The locked status of the power control circuitry of the hardware component power controller 50 is signalled to the system power controller 52 by means of an interrupt (IRQ). For this purpose the hardware component power controller 50 has the interrupt settings and generation circuitry 76. Power mode requests are also received by this component and when the power control circuitry is locked, and a power mode change request (e.g. a wake up request) is received, this is also signalled to the system power controller 52 by means of an interrupt (IRQ). If the system power controller 52 then determines that the power mode change request should be fulfilled, then it accessed the hardware component power controller 50 via the software interface 56 in order to write the unlock value to the unlock register 62, and thus release the lock status 72, so that the power mode change request allows the power mode of the component to be changed and as a consequence the status value 74 is updated.

Figure 3:
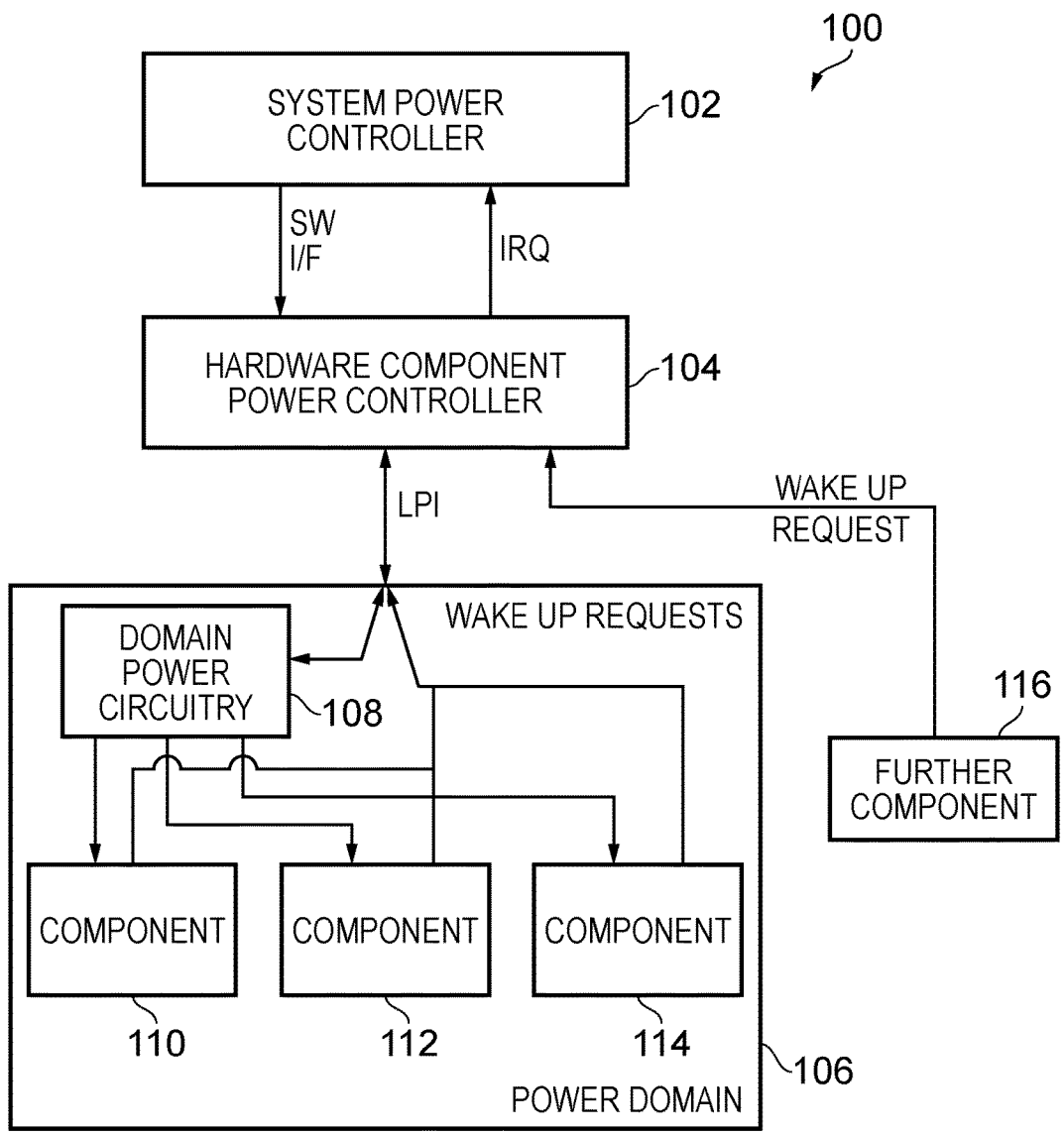
FIG. 3 schematically illustrates an apparatus in one embodiment in which several components are within a single power domain which is controlled by a single hardware component power controller.

FIG. 3 schematically illustrates a system 100 in one embodiment. Here, as in the previous figures, a single system power controller 102 communicates with a single hardware component power controller 104, but in contrast to the components and power domains of FIG. 1, here there are three components 110, 112 and 114 all within a single power domain 106, and which are hence all power controlled together. The selected power mode which the hardware component power controller 104 communicates, via the hardware interface labelled LPI (in this embodiment this hardware interface is provided by an ARM P-Channel low power interface) thus configures the domain power circuitry 108, and the components 110, 112 and 114 within the power domain 106 are all then subjected to the same power mode. Conversely, when any component within the power domain 106 wishes to wake up, its wake up request can only cause the entire power domain (and not just that component) to be moved into a different power mode (when that wake up request is granted). The wake up requests are also communicated to the hardware component power controller 104 via the hardware LPI interface. Note also that FIG. 3 schematically illustrates a further component 116 which may separately communicate with the hardware component power controller 104, and in particular send a wake up request for the power domain 106 to be woken up.

Figure 4:
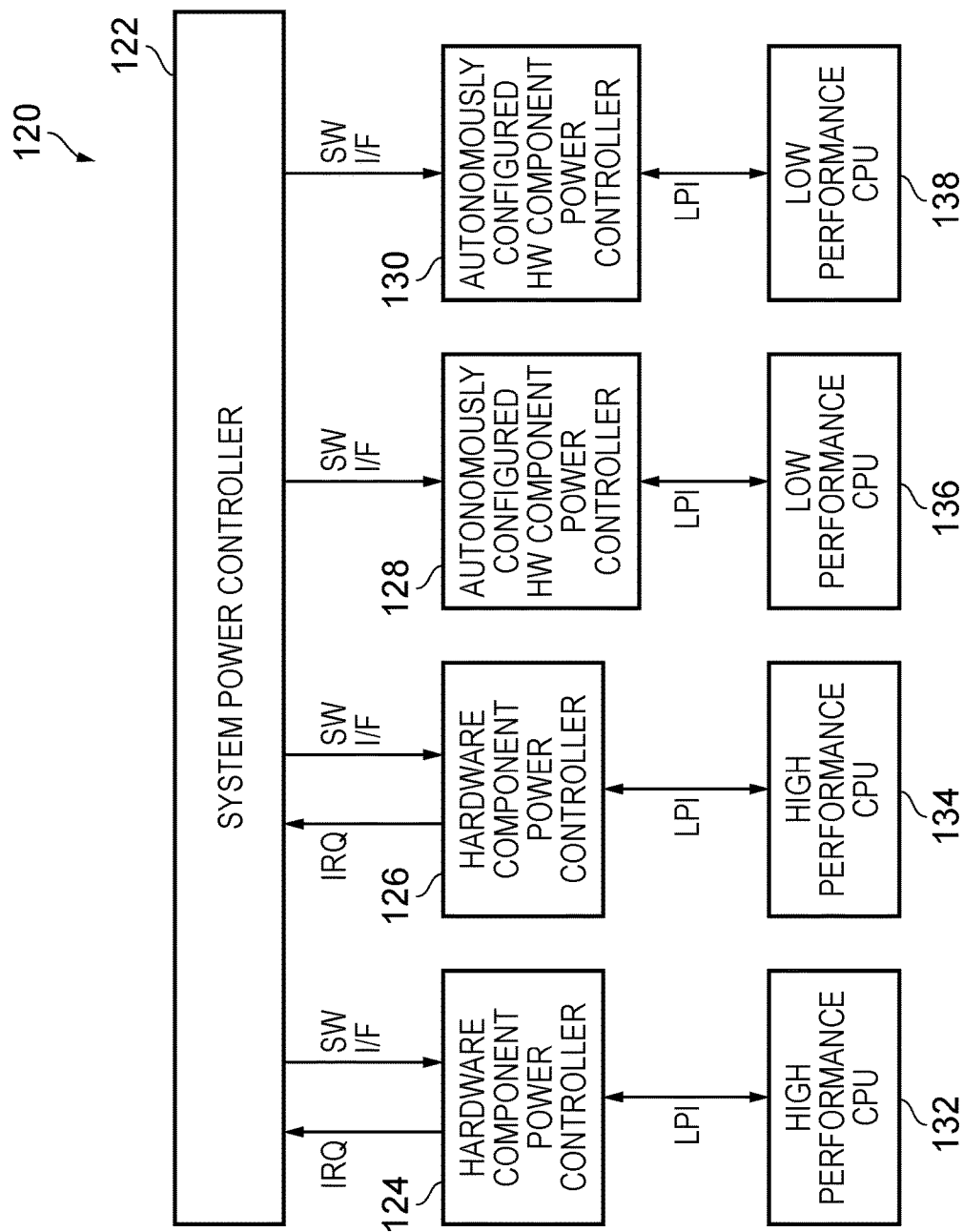
FIG. 4 schematically illustrates an apparatus in one embodiment in which the hardware component power controllers associated with two high performance CPUs have been configured to remain partially under the control of the system power controller, whilst the hardware component power controllers associated with two low performance CPUs have been configured to operate autonomously.

FIG. 4 schematically illustrates a further example system 120, in which a system power controller 122 interacts with four hardware component power controllers 124, 126, 128, and 130. Each of the hardware component power controllers is associated with a component of the system, which in this example is a processor core (CPU). As can be seen in the figure, these CPUs fall into two categories, namely the high performance CPUs 132 and 134, and the low performance CPUs 136 and 138. The system power controller 122 interacts with each of the hardware component power controllers via its software interface, and the labelling in FIG. 4 shows that the hardware component power controllers 128 and 130 have been configured by the system power controller to operate in an entirely autonomous manner. Accordingly, these hardware component power controllers 128 and 130 can freely switch the low performance CPUs 136 and 138 between any of the power modes available (for example on, retention, and off) without any locking of the power control resulting. Conversely, the system power controller 122 has configured the hardware component power controllers 124 and 126 to operate so that when one of these high performance CPUs is switched into its minimum power mode the power control of the hardware component power controller becomes locked, thus preventing further power mode changes of that CPU until the system power controller intervenes. This approach means that the system power controller can still effectively manage the system power and thermal budget, by maintaining control over when the high performance CPUs 132 and 134 are allowed to exit their off power modes, but the significance of the power consumption of the low performance CPUs 136 and 138 has been determined to be at such a level that it will not adversely affect the system power budget etc. Accordingly, as can be seen in FIG. 4, whilst autonomously configured in this manner, the hardware component power controllers 128 and 130 do not issue interrupts to the system power controller 122 since no communication of power mode requests or status is required.

Figure 5:
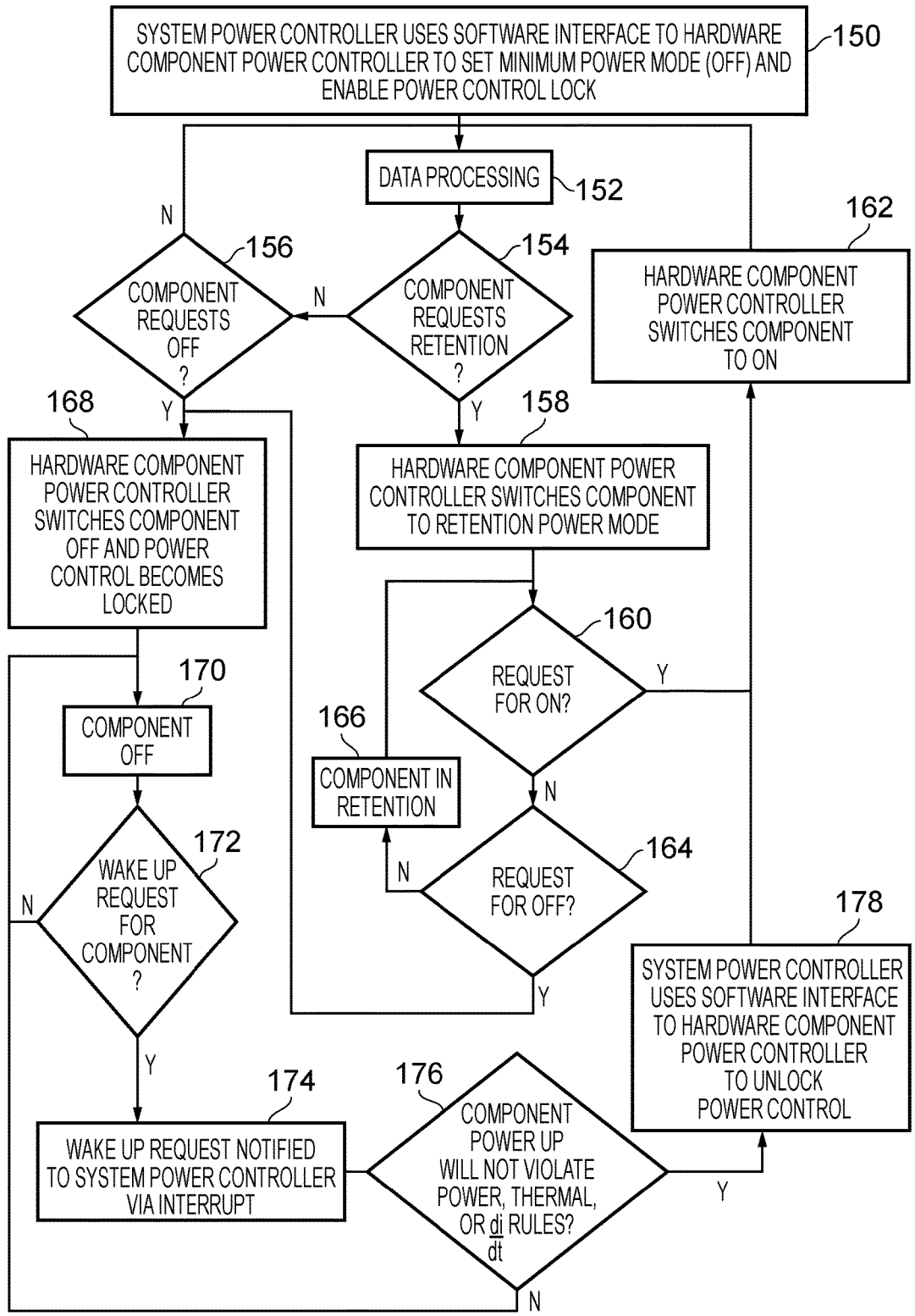
FIG. 5 shows a sequence of steps which are followed according to the method of one embodiment.

FIG. 5 shows a sequence of steps which are taken in the method of one embodiment. Initially, at step 150 the system power controller uses the software interface to a hardware component power controller to set its minimum power mode (off in the example of FIG. 5) and to enable the power control lock. In other words, via the software interface the system power controller writes to the relevant registers within the hardware component power controller to set this configuration up. At step 152 the usual data processing of the system continues. For the purposes of the present discussion, it is therefore assumed that the component at this stage is on and operational. It is then determined at step 154 if the component is requesting that it should enter its retention power mode. If this is not the case then the flow proceeds to step 156, where it is determined if the component is requesting switching off. If this is also not true then the flow simply loops back to step 152 and normal data processing continues, until such a power mode change request is received. Considering first step 154, if the component does request entering its retention power mode then the flow proceeds to step 158 where the hardware component power controller switches this component into its retention power mode. Thereafter it is determined at step 160 if (at some time later) a request has been received (either from or for the component) for the component to be switched into its on mode. If it does then the flow proceeds to step 162 where the hardware component power controller switches this component into its on power mode, the flow returns to step 152 and normal data processing continues. If at step 160 it is determined that the component has not requested its on power mode then the flow proceeds to step 164 where it is determined if a request has been received (either from or for the component) for the component to be switched off. Whilst this is not the case then the flow loops back via step 166 and the component remains in its retention power mode.

If it is determined at step 164 that the component has requested that it enters its off power mode, or indeed the same determination is made at step 156, then from either step the flow proceeds to step 168. Here, the hardware component power controller switches the component off and in doing so the power control of the hardware component power controller becomes locked. The flow then proceeds via step 170 (component off, power control locked) to step 172, where if there is a wake up request for this component (i.e. rather than from this component itself since it is generally not expected that a component which is off can issue its own wake up request) then the flow proceeds to step 174. Whilst no such request is received then the flow loops back to step 170 (i.e. the component remains off). On receipt of such a wake up request at step 174 the wake up request is notified by the hardware component power controller via an interrupt to the system power controller. At step 176 it is then determined by the system power controller if allowing the power component to power up will not violate any predetermined power, thermal, or rate of change of current rules which are currently set for the system. It should be appreciated that the system power controller may also determine whether to allow the component to power up according to other relevant criteria, such as a count of currently active/inactive system components. If it is determined at step 176 that such a violation will occur, i.e. the component should not at this stage be allowed to power up, the flow returns to step 170, leaving the component in its off power mode. However, when it is determined at step 176 that the component can be allowed to power up, the flow proceeds to step 178 where the system power controller uses the software interface of the hardware component power controller to write new values to the relevant registers to unlock the power control. The flow then proceeds to step 162 where the hardware component power controller switches the component on and with the flow proceeding to step 152 normal data processing resumes.

In brief overall summary, an apparatus and a corresponding method of operating the apparatus are disclosed. A component of the apparatus is capable of operating in one of at least two power modes and component power control circuitry which is communicatively coupled to the component causes the component to operate in a selected power mode of those power modes. A system power controller controls operation of the component power control circuitry by setting a power mode lock condition therein. When the power mode lock condition is met the component power control circuitry cannot change the selected power mode of the component. Power control over the component is thus partially delegated from the system power controller to the component power control circuitry.

In the present application, the words "configured to . . . " or "arranged to" are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" or "arranged to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope of the invention as defined by the appended claims. For example, various combinations of the features of the dependent claims could be made with the features of the independent claims without departing from the scope of the present invention.

We claim:

1. An apparatus for processing data comprising:
a component capable of operating in at least two power modes;
component power control circuitry communicatively coupled to the component to cause the component to operate in a selected power mode of the at least two power modes;
and
a system power controller comprising instruction execution circuitry to execute a set of instructions to control operation of the component power control circuitry by setting a power mode lock condition in the component power control circuitry, wherein when the power mode lock condition is met the component power control circuitry cannot change the selected power mode of the component,
wherein the component power control circuitry comprises interrupt generation circuitry to issue an interrupt to the system power controller to signal that the power mode lock condition is met, and
wherein the interrupt generation circuitry is capable of issuing an interrupt to the system power controller to signal a power mode change request to the system power controller whilst the power mode lock condition is met.

2. The apparatus as claimed in claim 1, wherein when the power mode lock condition is met the component power control circuitry cannot raise the selected power mode of the component from a first power mode of the at least two power modes to a second power mode of the at least two power modes, wherein a power consumption of the second power mode is greater than a power consumption of the first power mode.

3. The apparatus as claimed in claim 1, wherein the power mode lock condition defines a minimum power mode of the component and when the component power control circuitry causes the component to enter the minimum power mode a power mode setting circuitry of the component power control circuitry becomes locked,
and the component power control circuitry cannot change the selected power mode of the component until the system power controller unlocks the component power control circuitry.

4. The apparatus as claimed in claim 3, wherein the component is capable of requesting a specified power mode above the minimum power mode set by the system power controller.

5. The apparatus as claimed in claim 1, wherein the system power controller comprises system monitoring circuitry to monitor at least one system parameter from the group comprising:
a total power consumption of the apparatus;
a temperature of the apparatus; and
a rate-of-current-change in the apparatus,
and, when the power mode condition is met, the system power controller releases the power mode lock condition in dependence on the at least one system parameter.

6. The apparatus as claimed in claim 1, wherein the component power control circuitry comprises finite state machine circuitry, wherein a state of the finite state machine circuitry sets the selected power mode of the component and when the power mode lock condition is met the component power control circuitry cannot change the state of the finite state machine circuitry.

7. The apparatus as claimed in claim 1, wherein the component power control circuitry comprises at least one register, wherein content of the at least one register defines the power mode lock condition, and the system power controller is capable of changing the content of the at least one register via a software interface between the system power controller and the component power control circuitry.

8. The apparatus as claimed in claim 1, wherein the component power control circuitry is responsive to a power mode change request from the component to change the selected power mode of the component when the power mode lock condition is not met.

9. The apparatus as claimed in claim 1, wherein the component power control circuitry is responsive to a power mode change request from another component in the apparatus to change the selected power mode of the component when the power mode lock condition is not met.

10. The apparatus as claimed in claim 1, further comprising a further component capable of operating in at least two power modes, wherein the further component is capable of autonomously switching between the at least two power modes independently of the system power controller.

11. The apparatus as claimed in claim 1, comprising a further component comprised within a shared power domain with the component, wherein the further component is capable of operating in the at least two power modes and a domain power mode of the shared power domain defines the selected power mode,
wherein the component power control circuitry is communicatively coupled to the shared power domain to cause all components in the shared power domain to operate in the selected power mode of the at least two power modes, and
wherein when the power mode lock condition is met the component power control circuitry cannot change the selected power mode of the shared power domain.

12. A method of operating an apparatus for processing data comprising:
signaling to a component of the apparatus from component power control circuitry of the apparatus to cause the component to operate in a selected power mode of at least two power modes;
operating the component of the apparatus in the selected power mode;
executing a set of instructions in a system power controller to control operation of the component power control circuitry by setting a power mode lock condition in the component power control circuitry; and when the power mode lock condition is met, preventing the component power control circuitry from changing the selected power mode of the component, issuing an interrupt to the system power controller to signal that the power mode lock condition is met, and further issuing an interrupt to the system power controller to signal a power mode change request whilst the power mode lock condition is met.

* * * * *